March 19, 1968      J. A. HELMER      3,373,850

PARKING LOCK MECHANISM FOR VEHICLES, ESPECIALLY MOTOR VEHICLES

Filed June 24, 1966      2 Sheets-Sheet 1

INVENTOR
JOSEF A. HELMER

BY *Dicke + Craig*

ATTORNEYS

March 19, 1968   J. A. HELMER   3,373,850
PARKING LOCK MECHANISM FOR VEHICLES, ESPECIALLY MOTOR VEHICLES
Filed June 24, 1966   2 Sheets-Sheet 2

INVENTOR

JOSEF A. HELMER

BY *Dicke + Craig*
ATTORNEYS

United States Patent Office 3,373,850
Patented Mar. 19, 1968

3,373,850
PARKING LOCK MECHANISM FOR VEHICLES,
ESPECIALLY MOTOR VEHICLES
Josef A. Helmer, Aich, Kreis Nurtingen, Germany, assignor to Daimler-Benz Aktiengesellschaft, Stuttgart-Unterturkheim, Germany
Filed June 24, 1966, Ser. No. 560,173
Claims priority, application Germany, June 26, 1965,
D 47,603
23 Claims. (Cl. 192—4)

ABSTRACT OF THE DISCLOSURE

A parking lock mechanism for vehicles, especially motor vehicles having automatically shifting change-speed transmissions, particularly change-speed transmissions actuated by a pressure medium and provided with a hydrodynamic transmission part or the like connected ahead of the change-speed gear, in which the pressure for shifting the change-speed gear is influenced by a control or regulating device dependent on the output rotation speed, which control device is arranged within a cover adjoining the change-speed gear housing and separated therefrom by a partition wall, and to which is coordinated a housing part accommodating the supply and discharge, and whereby a toothed locking detent or locking pawl serves as parking lock means which is pivotally connected at one end and is provided at the other end with tooth means for the lateral engagement into the teeth provided at the circumference of the output shaft and disposed within the housing part, which locking detent or pawl is brought into and held in engagement by means of an actuating roller supported in a frictionless manner and movable by means of an elastic linkage between an abutment and the detent, and whereby the disengagement of the locking detent—after removal of the roller pressure—takes place automatically by the circumferential force of the output shaft by means of a corresponding beveling of the two toothed systems.

BACKGROUND OF THE INVENTION

With a known parking lock of the aforementioned type, the locking pawl or detent is pivotally mounted at the partition wall between the change-speed gear housing and the cover above the output shaft and also above the housing part accommodating the pressure medium supply and discharge lines for the control or regulator means. The actuation of the locking pawl or detent takes place by means of a roller supported at a lever in anti-friction bearings for friction reasons. The lever serves simultaneously as counter abutment for the roller, is itself supported by anti-friction bearings and is also pivotally mounted at the partition wall. The lever is actuated by means of an elastic actuating rod engaging at the lever, which actuating rod is mechanically connected with the drive-selector lever of the vehicle. The somewhat costly anti-friction bearing support of both the roller as also of the lever is necessary with this known construction in order to enable a disengagement of the parking lock under load, for example, when parking the vehicle on an inclined or steep road. The lever is pivotally connected laterally at the partition wall and during its actuation sweeps over a relatively large sector surface of a circle corresponding to its dimensions. By reason of these facts, as also by the aforementioned pivotal connection of the locking detent or pawl above the output shaft, undesirably large dimensions of the cover accommodating the comparatively small controller result therefrom.

SUMMARY OF THE INVENTION

The present invention now aims at achieving a considerable improvement of the known parking lock mechanism—however with the maintenance of the aforementioned principle which is appropriate, per se—and also to eliminate at the same time the aforementioned disadvantages. As solution to the underlying problem, the present invention proposes that the point of pivotal connection of the locking pawl or locking detent is located below the output shaft and that the actuating roller for the locking detent is arranged on a sliding or friction bearing at the end of the elastic actuating rod and that a roller is provided as counter abutment for the actuating roller which is supported by anti-friction bearing means and that the counter-abutment roller and the locking detent joint are arranged in the housing part secured at the partition wall.

The cover accommodating the controller or regulator can now be constructed relatively low as a result of the displacement in accordance with the present invention of the point of pivotal connection of the locking detent below the driven shaft. Furthermore, by the use of a roller as counter abutment for the actuating roller and by the direct support thereof at the actuating rod, lateral constructional space is economized so that the cover not only can be advantageously constructed relatively low but also relatively narrow corresponding to the dimensions of the regulator or controller.

Therebeyond, the use of a roller supported on an anti-friction roller bearing as counter abutment for the actuating roller entails the advantage that the anti-friction bearing support at the latter can be saved. Of course, it is also within the scope of the present invention to provide the actuating roller itself with an anti-friction bearing and to provide the abutment roller with a sliding or friction bearing. A further advantage of the present invention results from the arrangement of the locking detent or locking pawls as well as also of the abutment roller in the housing part secured at the partition wall, which housing part also accommodates the tooth means for the engagement of the locking detent. It is now possible to install these parts to be accurately matched to one another together with the housing part as a preassembled unit at the partition wall.

The guidance of the actuating roller can take place in any suitable manner, for example, by means of a guided actuating rod; however, the present invention preferably provides that the bearing bolt of the actuating roller supported in a friction or gliding bearing which is secured at the elastic actuating rod, is guided within a guide track and that this guide track is also arranged in the housing part. As already mentioned above, already during the manufacture of the housing part, the exact coordination of locking detent, abutment roller and actuating roller may be matched to one another.

The shape of the guide track or cam is appropriately so selected that the actuating roller does not with certainty come into engagement with the locking detent during the shifting of the different transmission selector ranges. Simultaneously therewith, the guide track, however, should be constructed as rectilinearly as possible within the immediate engaging area of the actuating roller as well as also within the area coordinated to the different selector ranges in order to assure a displacement of the bearing bolt within the guide track that is free from jamming or obstruction. At the transition place of the two aforementioned guide track ranges, the present invention recommends to provide the guide track or cam with a slight bent in order to render noticeable the transition possible during the shifting of the preselector lever.

The present invention further proposes as to the details of the construction of the guide track that the latter has a relatively large play with respect to the bearing bolt within the range corresponding to the engaging position of the actuating roller and that the guide track permits to the bearing bolt an essentially play-free gliding movement within the remaining range. The play in the engaging range permits in an advantageous manner an accurate adjustment of the actuating roller between the locking detent and the abutment roller whereas any rattling of the disengaged roller is effectively prevented in the remaining range of the guide track as a result of the gliding fit within the same.

As regards the engaging position of the actuating roller, the present invention proposes that the actuating roller abuts against a vertically extending surface of the locking detent and that the center of the actuating roller thereby lies somewhat below the center of the abutment roller. It would, of course, also be feasible and fully within the scope of the present invention to construct the abutment surface at the locking detent inclined in such a manner that a tapering channel which becomes narrower in the downward direction would be formed between the locking-detent abutment surface and the abutment roller. This inclined construction of the abutment surface would have the advantage of a very easy and shock-free running up of the actuating roller on the abutment surface. In this case the contact point of the actuating and abutment rollers would have to lie according to the aforementioned inventive concept below the contact point of a tangent at the abutment roller which is parallel to the locking detent abutment surface. In this manner, the actuating roller is retained in engagement by the curvature of the abutment roller which forms between itself and the locking detent abutment surface a channel that becomes narrower in the upward direction. The measures described hereinabove are valid for a preferred engaging direction of the actuating roller from the top toward the bottom, that is, in the downward direction, i.e., in relation to the point of pivotal connection of the locking detent—radially from the outside toward the inside. With a reversed engaging direction, i.e.—related to the point of pivotal connection of the locking detent—radially from the inside toward the outside, which of course falls within the scope of the present invention, it is natural that a corresponding construction applies in an analogous manner.

Corresponding to the engaging direction of the actuating roller, the loading or stressing of the actuating rod for the same also changes. For the preferred case that the actuating rod is arranged below the abutment roller and below the output shaft, the actuating rod would, for example, be stressed or loaded in compression during the engagement of the actuating roller and vice versa during disengagement in tension, if the engaging operation—as related to the point of pivotal connection of the locking detent—takes place radially from the inside toward the outside. However, the present invention preferably proposes that the engagement and disengagement of the actuating roller and therewith of the locking detent takes place by tension and pressure on the actuating rod. In order that an engagement of the preselector lever can take place also in case of a tooth-on-tooth position of the output shaft and locking detent, the present invention proposes that the actuating rod is elastic during the engagement and is rigid during the disengagement. For the aforementioned configuration of the teeth of the locking detent and of the output shaft a prestress of the actuating rod then takes place during the engagement which, after a slight rotation of the output shaft, effects immediately and automatically a parking locking action in the transmission.

The construction of the elastic actuating rod is, in principle, completely within the choice of the engineer and designer. Thus, for example, two essentially identical rod parts would be feasible which are connected by a tensional spring element. However, the present invention preferably proposes that the unilaterally elastic actuating rod consists in a telescopic-like manner of a sleeve part and of a rod part arranged within the sleeve part and displaceable in the extension direction against a spring force. The telescopic construction of the actuating rod offers the advantage that the inner rod part is guided well in the outer sleeve part. Furthermore, the spring means may be arranged within the sleeve part which signifies a protection against damage and soiling thereof.

For example, a tension spring might serve as spring means which is arranged between the sleeve bottom and the oppositely disposed rod end. However, a preferred construction of the present invention provides that the rod part is provided at its end arranged in the sleeve part with a collar and that the aperture of the sleeve part is closed off by a cover, through which extends the rod part, and that a coil-shaped compression spring is arranged in the sleeve part—surrounding the rod part—which is supported, on the one hand, against the collar of the rod part and on the other, against the cover of the sleeve part and that the collar is pressed by the pre-stressed compression spring against the bottom of the sleeve part. This construction makes possible advantageously a compact construction of the actuating rod as, on the one hand, the compression spring is arranged surrounding the rod part and, on the other, no separate securing measures need to be taken for the same in contrast to a tension or draw spring. Abutment surfaces for the compression spring suffice on both sides.

The coordination of the two parts of the actuating rod with respect to the speed selector lever linkage, on the one hand, and with respect to the actuating roller, on the other, is, in principle, at the will of the designer. For example, the rod part might be coordinated to the speed selector lever linkage and the sleeve part to the actuating roller. However, the present invention preferably provides that the sleeve part is connected with the preselector lever linkage and the rod part with the actuating roller. By reason of the relatively slender construction of the rod part compared to the sleeve part, a larger freedom of movement is made possible thereby to the locking detent in an advantageous manner.

Accordingly, it is an object of the present invention to provide a parking lock mechanism for change-speed transmissions of the type described above which eliminates by simple means the shortcomings and drawbacks encountered with the prior art constructions.

Another object of the present invention resides in a parking lock mechanism for vehicles which may be readily actuated in both the engaging and disengaging directions regardless of the inclination of the road.

A further object of the present invention resides in a parking lock mechanism for motor vehicles in which the various parts are of relatively compact construction, thereby reducing the over-all dimensions of the mechanism and housing accommodating the same.

Still a further object of the present invention resides in a parking lock mechanism for vehicles which minimizes the need for anti-friction bearings, yet assures a rattle-free and completely reliable operation under all operating conditions of the vehicle.

Still another object of the present invention resides in a parking lock mechanism for motor vehicles in which an elastic engagement of the parking lock is appropriately available while only a rigid connection is available for the disengagement thereof.

DESCRIPTION OF THE DRAWING

These and further objects, features, and advantages of the present invention will become more obvious from the following description when taken in connection with the accompanying drawing which shows, for purposes of illustration only, one embodiment in accordance with the present invention, and wherein.

Figure 1:
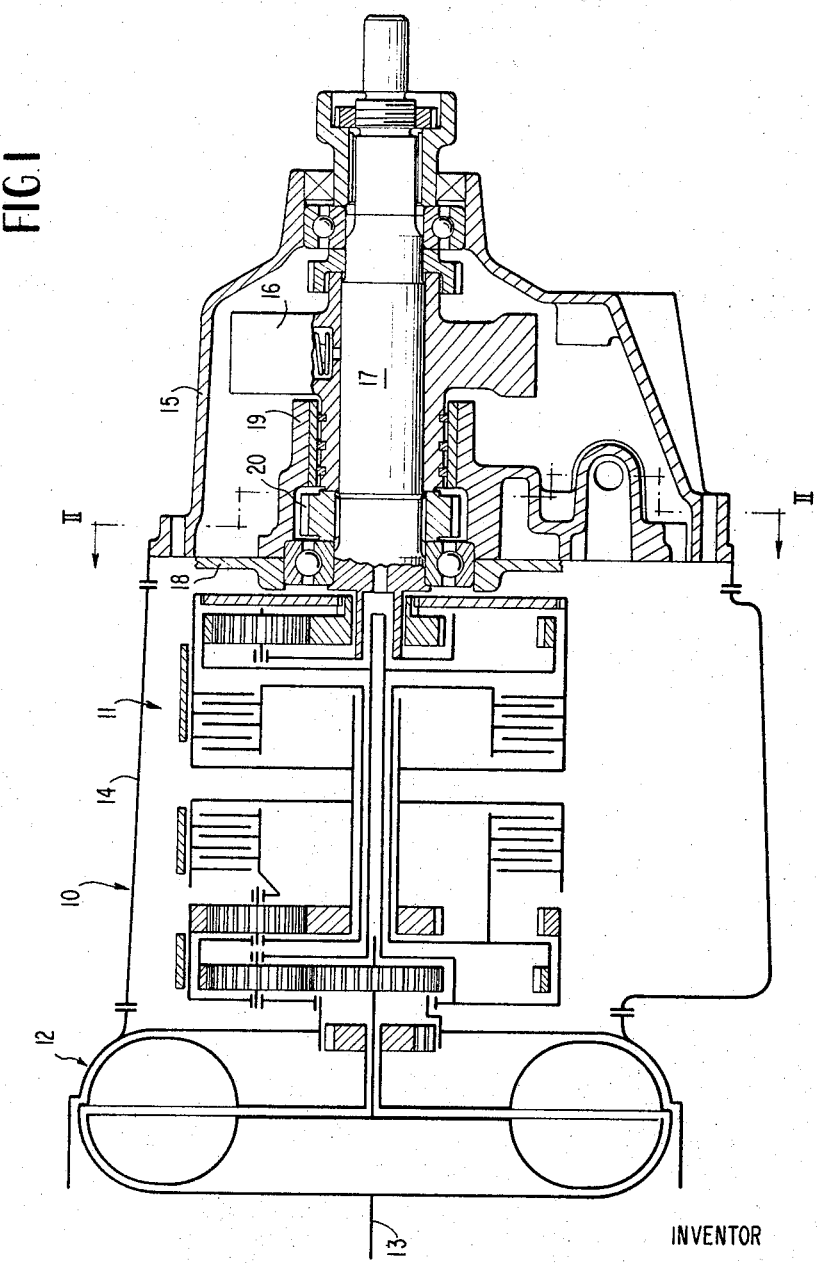
FIGURE 1 is an axial longitudinal cross-sectional view through a vehicle change-speed gear of the type described above, with some of the parts indicated only schematically.
Figure 2:
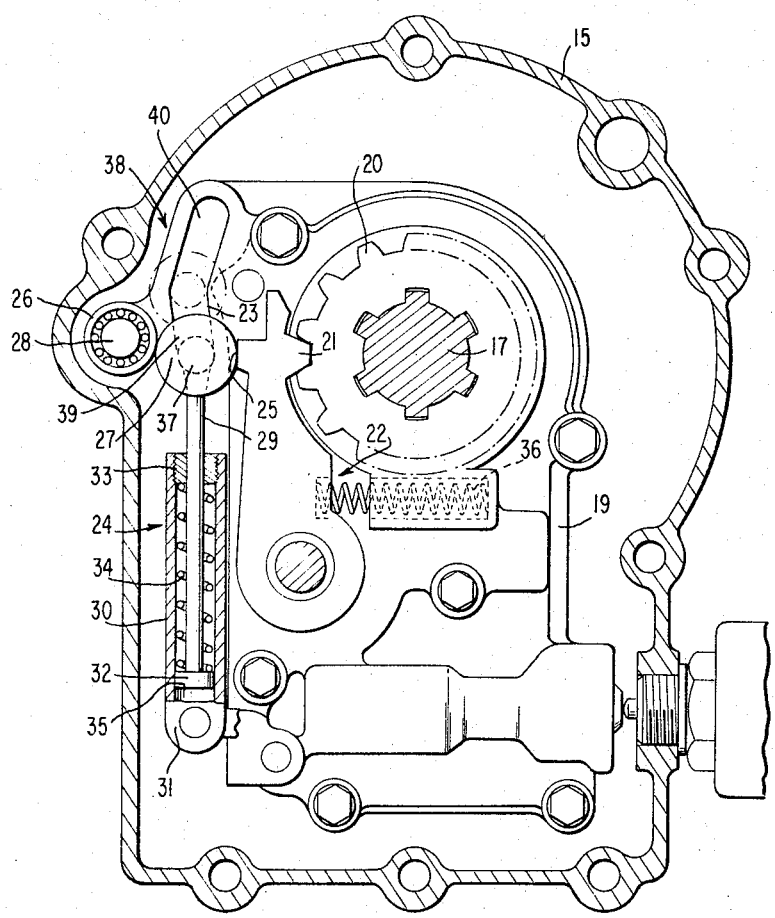
FIGURE 2 is a transverse cross-sectional view taken along line II—II of FIGURE 1.

Referring now to the drawing wherein like reference numerals are used throughout the two views to designate like parts, and more particularly to FIGURE 1, reference numeral 10 designates therein a change-speed gear which includes a mechanical part generally designated by reference numeral 11 shifted by means of a pressure medium and a hydrodynamic part generally designated by reference numeral 12 which is connected ahead or in front of the mechanical part 11 and which is constructed in the illustrated embodiment as hydrodynamic coupling. The drive from the engine (not illustrated) takes place by way of the drive shaft 13. A cover 15 is flangedly connected to the housing 14 of the mechanical change-speed gear part 11. The cover 15 serves for the accommodation of a control device 16 of conventional construction regulating the shifting pressure for the mechanical gear part 11. The control device 16 is secured on the transmission output shaft 17 and is influenced by the rotational speed thereof. The cover 15 and the space enclosed therewithin is separated from the mechanical gear part 11 by a partition wall 18 cast integral with the housing 14 of the mechanical gear part 11. A housing part 19 is secured at the partition wall 18 within the cover 15 which serves for the accommodation of the pressure supply and discharge lines for the control device 16 and further for the sealing of the interior space of the cover 15 with respect to the mechanical transmission part 11. A toothed rim 20 is arranged within the housing part 19 which is non-rotatably mounted on the output shaft 17. As can be readily seen from FIGURE 2, the toothed rim 20 serves for the engagement with a locking pawl or locking detent generally designated by reference numeral 22 provided with corresponding tooth means 21 which, together with the toothed rim 20, forms a parking locking device. The locking detent 22 is pivotally connected at the housing part 19 below the output shaft 17. An actuating roller 23 serves for the actuation of the locking detent 22 which is slidingly supported at the end of an actuating rod generally designated by reference numeral 24. The locking detent 22 illustrated in FIGURE 2 in the engaged position is brought into and held in engagement with the toothed rim 20 by means of the actuating roller 23. The actuating roller 23 is thereby supported, on the one hand, against a vertical abutment surface 25 provided at the locking detent 22 and, on the other, against a roller 26 serving as abutment and supported in the housing part 19 by appropriate anti-friction bearings. The center 27 of the actuating roller 23 thereby lies slightly below the center 28 of the abutment roller 26 in order to prevent a sliding out of the actuating roller 23 out of the engaging position thereof. The actuating rod 24 serving for the displacement or movement of the actuating roller 23 is constructed in a telescopic manner and consists accordingly of a rod part 29 at whose outer end is supported the actuating roller 23, and of a sleeve part 30 which accommodates the rod part 29 and axially guides the same. The sleeve part 30 is connected with its end 31 by means of a mechanical linkage (not shown) with the conventional preselector or driving range selector lever of the vehicle (also not illustrated).

The rod part 29 is provided at its end disposed within the sleeve part 30 with a collar 32, and the sleeve part 30 is closed off by a cover 33 through which extends the rod part 29. Prestressed coil-shaped compression spring 34 is supported, on the one hand, between the cover 33 and, on the other, the collar 32 which spring 34 surrounds the rod part 29, whereby the actuating rod structure receives in its drawing or pulling direction an elasticity corresponding to the spring characteristics. In the pressure direction, the rod part 29 abuts with its collar 32 against the bottom 35 of the sleeve part 30, and the actuating rod structure 24 therewith becomes rigid in the pressure direction. The actuating roller 23 is brought into engagement radially from the outside toward the inside—in relation to the point of pivotal connection of the locking detent 22—whereby the actuating rod structure 24 is loaded or stressed in tension. The elasticity thereof in the tensional or drawing direction thereby enables in an advantageous manner an engagement of the preselector lever into the parking position also in case of a tooth-on-tooth position of the locking detent 22 and toothed rim 20. The actuation rod 24 is thereby elastically stretched under further prestress of the compression spring 34 and upon slight rotation of the output shaft 17 corresponding to a tooth width, the locking detent 22 then automatically engages into the toothed rim 20 and thus locks the parking locking device.

During the disengagement of the actuating roller 23—as related to the point of pivotal connection of the locking detent 22 radially from the inside toward the outside—the actuating rod 24 is rigid, and the actuating roller 23 has to overcome only the slight friction of its own sliding or friction bearing and the still smaller bearing friction of the abutment roller 26 supported by anti-friction bearing means. During rotation of the output shaft 17 an automatic disengagement of the locking detent can now take place as a result of the circumferential force of the output shaft 17 and a corresponding beveling or chamfering of the two toothed systems 20 and 21. In order to prevent during the drive—for example, as a result of vibrations—a to and fro beating of the locking detent 22 and an engagement thereof with the toothed rim 20, possibly caused thereby, a relatively weak compression spring 36 is provided which is supported, on the one hand, at the housing part 19 and, on the other, at the locking detent 22.

It is also necessary to keep the actuating roller 23 operatively connected with the preselector lever by the actuating rod 24 out of engagement with certainty during the drive and particularly during the change of the transmission range or ratio. For this purpose, the actuating roller 23 is guided by means of its bearing pin 37 within a guide track generally designated by reference numeral 38 and machined into the housing part 19. The guide track 38 is subdivided by a slight bent into two ranges 39 and 40 whereby the range 39 coordinated to the engaging position of the actuating roller 23 has a comparatively large play with respect to the bearing pin 37 in order to permit an automatic adjustment of the actuating roller 23 between the abutment surface 25 and the abutment roller 26. The guide track range 40 coordinated to the disengaging positions of the actuating roller 23 is constructed playfree, i.e., substantially without play, therefore permits only a sliding movement of the bolt 37 and therewith prevents any possible annoying rattling noises of the bearing pin 37 during the drive.

The considerable advantage of the present invention as described above consists in the compact construction of the parking lock mechanism—conditioned by the pivotal connection of the locking detent 22 below the output shaft 17 and by the actuating mechanism by means of the actuating roller 23 and the abutment roller 26—whence relatively small dimensions of the cover 15 are made possible. Therebeyond, the arrangement of the locking detent 22, of the abutment roller 26, as well as of the guide track 38 within the housing part 19 entails the advantage of a preassembly of the parking lock device together with the housing part 19 and a more facilitated matching or adaptation thereof to one another.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A parking lock mechanism for vehicles, comprising shaft means provided with circumferential tooth means, a relatively fixed structure, said shaft means being rotatably supported in said fixed structure, locking detent means, means pivotally mounting said locking detent means at one end thereof on said fixed structure, the other end of said locking detent means being provided with tooth means for engagement with the circumferential tooth means on said shaft means, actuating means including actuating roller means for engaging said detent means and holding the same in the engaged position when pressure is applied to said roller means and for automatically disengaging said detent means upon removal of said pressure, abutment means, and elastic linkage means operatively connected with said actuating roller means for actuating the latter into the engaging position between said abutment means and said detent means, the point of pivotal connection of said detent means being located below said shaft means, said actuating roller means being arranged on a gliding bearing means at the end of the elastic actuating linkage means, and said abutment means including abutment roller means and anti-friction means rotatably supporting said abutment roller means.

2. A device according to claim 1, further comprising gliding bearing means for supporting said actuating roller means, the tooth means of said toothed rim means and of the other end of the detent means being beveled off to cause automatic disengagement of the parking lock upon removal of the roller pressure of said actuating roller means.

3. A parking lock device for a motor vehicle having an automatically shifted change-speed gear, in which the pressure of the pressure medium for shifting the change-speed gear is influenced by control means dependent on the rotational speed of the output shaft according to claim 2, further comprising housing means for said change-speed gear, cover means adjoining said housing means and being separated therefrom by a partition wall, said control means being arranged within said cover means, a housing part within said cover means accommodating the supply and discharge lines for the pressure medium, said abutment roller means and said locking detent means being arranged within said housing part and said housing part being secured at said partition wall.

4. A parking lock device according to claim 3, further comprising bearing pin means secured at the elastic actuating linkage means for supporting said actuating roller means, and guide track means forming a part of said gliding bearing means for guiding said bearing pin means.

5. A parking lock device according to claim 4, wherein said guide track means is also arranged within said housing part.

6. A parking lock device according to claim 5, wherein said guide track means is provided with a relatively large play with respect to the bearing pin means within the area thereof corresponding to the engaging position of the actuating roller means and enables said bearing pin means to slide essentially without play within the remaining area thereof.

7. A parking lock device according to claim 6, wherein said detent means is provided with a substantially vertically extending surface, said actuating roller means abutting against said surface in the engaging position thereof, and the center of the actuating roller means being slightly below the center of the abutment roller means in the engaging position.

8. A parking lock device according to claim 7, wherein the engagement and disengagement of said actuating roller means and therewith of the locking detent means takes place, respectively, by tension and pressure on said actuating linkage means, said actuating linkage means being elastic during engagement and rigid during disengagement.

9. A parking lock device according to claim 8, wherein the unilaterally elastic actuating linkage means is of telescopic construction and includes a sleeve part and a rod part arranged within the sleeve part and being displaceable against a spring force in the expansion direction thereof.

10. A parking lock device according to claim 9, wherein said rod part is provided with a collar at the end arranged within the sleeve part, the opening of the sleeve part being closed off by means of a cover through which extends the rod part, a coil-shaped compression spring disposed within said sleeve part and surrounding said rod part, said compression spring being supported on the one hand against the collar of the rod part and on the other against the cover of the sleeve part, and said collar being pressed by the prestressed compression spring against the bottom of the sleeve part.

11. A parking lock device according to claim 10, further comprising a range selector lever linkage, means operatively connecting said sleeve part with said range selector lever linkage, and said rod part being operatively connected with said actuating roller means.

12. A parking lock device according to claim 1, further comprising bearing pin means secured at the elastic actuating linkage means for supporting said actuating roller means, and guide track means forming a part of said gliding bearing means for guiding said bearing pin means.

13. A parking lock device according to claim 12, wherein said guide track means is provided with a relatively large play with respect to the bearing pin means within the area thereof corresponding to the engaging position of the actuating roller means and enables said bearing pin means to slide essentially without play within the remaining area thereof.

14. A parking lock device according to claim 13, wherein said detent means is provided with a substantially vertically extending surface, said actuating roller means abutting against said surface in the engaging position thereof, and the center of the actuating roller means being slightly below the center of the abutment roller means in the engaging position.

15. A parking lock device according to claim 14, wherein the engagement and disengagement of said actuating roller means and therewith of the locking detent means takes place, respectively, by tension and pressure on said actuating linkage means, said actuating linkage means being elastic during engagement and rigid during disengagement.

16. A parking lock device according to claim 15, wherein the unilaterally elastic actuating linkage means is of telescopic construction and includes a sleeve part and a rod part arranged within the sleeve part and being displaceable against a spring force in the expansion direction thereof.

17. A parking lock device according to claim 16, wherein said rod part is provided with a collar at the end arranged within the sleeve part, the opening of the sleeve part being closed off by means of a cover through which extends the rod part, a coil-shaped compression spring disposed within said sleeve part and surrounding said rod part, said compression spring being supported on the one hand against the collar of the rod part and on the other against the cover of the sleeve part, and said collar being pressed by the prestressed compression spring against the bottom of the sleeve part.

18. A parking lock device according to claim 17, further comprising a range selector lever linkage, means operatively connecting said sleeve part with said range selector lever linkage, and said rod part being operatively connected with said actuating roller means.

19. A parking lock device according to claim 1, wherein said detent means is provided with a substantially vertically extending surface, said actuating roller means abutting against said surface in the engaging position thereof, and the center of the actuating roller means being slightly below the center of the abutment roller means in the engaging position.

20. A parking lock device according to claim 1, wherein the engagement and disengagement of said actuating roller means and therewith of the locking detent means takes place, respectively, by tension and pressure on said actuating linkage means, said actuating linkage means being elastic during engagement and rigid during disengagement.

21. A parking lock device according to claim 20, wherein the unilaterally elastic actuating linkage means is of telescopic construction and includes a sleeve part and a rod part arranged within the sleeve part and being displaceable against a spring force in the expansion direction thereof.

22. A parking lock device according to claim 21, wherein said rod part is provided with a collar at the end arranged within the sleeve part, the opening of the sleeve part being closed off by means of a cover through which extends the rod part, a coil-shaped compression spring disposed within said sleeve part and surrounding said rod part, said compression spring being supported on the one hand against the collar of the rod part and on the other against the cover of the sleeve part, and said collar being pressed by the prestressed compression spring against the bottom of the sleeve part.

23. A parking lock device according to claim 21, further comprising a range selector lever linkage, means operatively connecting said sleeve part with said range selector lever linkage, and said rod part being operatively connected with said actuating roller means.

References Cited
UNITED STATES PATENTS

| | | | |
|---|---|---|---|
| 3,001,618 | 9/1961 | McCordic et al. | 192—4 |
| 3,043,403 | 7/1962 | Kelley | 192—4 |

CARLTON R. CROYLE, *Primary Examiner.*

C. LEEDOM, *Assistant Examiner.*